(12) United States Patent
Arimilli et al.

(10) Patent No.: US 6,658,536 B1
(45) Date of Patent: Dec. 2, 2003

(54) CACHE-COHERENCY PROTOCOL WITH RECENTLY READ STATE FOR EXTENDING CACHE HORIZONTALLY

(75) Inventors: Ravi Kumar Arimilli, Austin, TX (US); John Steven Dodson, Pflugerville, TX (US); John Michael Kaiser, Cedar Park, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/839,547

(22) Filed: Apr. 14, 1997

(51) Int. Cl.⁷ .............................................. G06F 12/00
(52) U.S. Cl. ...................... 711/141; 711/130; 711/145
(58) Field of Search .............................. 711/145, 144, 711/121, 141, 124, 130

(56) References Cited

U.S. PATENT DOCUMENTS

| | | | |
|---|---|---|---|
| 4,959,777 A | | 9/1990 | Holman, Jr. ................. 364/200 |
| 5,113,514 A | * | 5/1992 | Albonesi et al. ............ 711/144 |
| 5,263,144 A | * | 11/1993 | Zurawski et al. ............ 711/121 |
| 5,289,588 A | | 2/1994 | Song et al. .................. 395/425 |
| 5,297,269 A | * | 3/1994 | Donaldson et al. ......... 711/145 |
| 5,303,362 A | * | 4/1994 | Butts, Jr. et al. ............ 711/121 |
| 5,317,716 A | | 5/1994 | Liu .............................. 395/425 |
| 5,479,630 A | | 12/1995 | Killian ........................ 395/403 |
| 5,522,057 A | | 5/1996 | Lichy .......................... 395/471 |
| 5,551,005 A | | 8/1996 | Sarangdhar et al. ........ 395/472 |
| 5,623,632 A | * | 4/1997 | Liu et al. ..................... 711/144 |
| 5,715,428 A | * | 2/1998 | Wang et al. ................. 711/141 |

* cited by examiner

Primary Examiner—David Hudspeth
Assistant Examiner—Fred F. Tzeng
(74) Attorney, Agent, or Firm—Richard A. Henkler; Bracewell & Patterson, L.L.P.

(57) ABSTRACT

A method of extending a cache of a processing unit in a multi-processor computer system, by expanding the prior-art MESI cache-coherency protocol to include an additional cache-entry state corresponding to a most recently accessed state. A value is loaded from system memory into one or more caches of adjacent processing units, and when a requesting processing unit issues an inquiry onto the system bus to read the value, the value is sourced from the cache of the adjacent processing unit containing a copy of the value that was most recently accessed. Each cache has at least one cache line with a block for storing the value, and an indication is provided that a cache line having a block which contains an instruction or data is in a "recently read" state. Each cache entry has three bits to indicate the current state of the cache entry (one of five possible states). Any caches containing a valid copy of the value, other than the cache which contains a copy of the value that was most recently accessed, are assigned a state indicating that they hold the valid copy in a shared state. This protocol allows instructions and data which are shared among several caches to be sourced directly (intervened) by the cache having the most recently accessed copy, without retrieval from system memory (RAM), significantly improving the processing speed of the computer system.

42 Claims, 2 Drawing Sheets

CACHE-COHERENCY PROTOCOL WITH RECENTLY READ STATE FOR EXTENDING CACHE HORIZONTALLY

BACKGROUND OF THE INVENTION

1. Field of the Invention

The present invention generally relates to computer systems, and more particularly to a cache-coherency protocol which provides for a most recently referenced state allowing improvements in cache intervention which effectively extend a processor's cache horizontally.

2. Description of the Related Art

The basic structure of a conventional multi-processor computer system 10 is shown in FIG. 1. Computer system 10 has several processing units, two of which 12a and 12b are depicted, which are connected to various peripheral devices, including input/output (I/O) devices 14 (such as a display monitor, keyboard, graphical pointer (mouse), and a permanent storage device (hard disk)), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct-memory-access channels (not shown). Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical; that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corporation. The processing unit can also have one or more caches, such as an instruction cache 24 and a data cache 26, which are implemented using high-speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In an SMP computer, it is important to provide a coherent memory system, that is, to cause writes to each individual memory location to be serialized in some order for all processors. For example, assume a location in memory is modified by a sequence of write operations to take on the values: 1, 2, 3, 4. In a cache-coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent." Virtually all coherency protocols operate only to the granularity of the size of a cache block. That is to say, the coherency protocol controls the movement of and write permissions for data and instructions on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to carry out the write. The key issue is that all other processors in the system must be informed of the write by the initiating processor before the write occurs. Furthermore, if a block is present in the L1 cache of a given processing unit, it is also present in the L2 and L3 caches of that processing unit. This property is known as inclusion and is well-known to those skilled in the art. Henceforth, it is assumed that the principle of inclusion applies to the caches related to the present invention.

To implement cache coherency in a system, the processors communicate over a common generalized interconnect (i.e., bus 20). The processors pass messages over the interconnect indicating their desire to read or write memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower-level caches, the request is then presented on the generalized interconnect (20) to be serviced. Once an operation has been placed on the generalized interconnect, all other lower-level caches snoop the operation and determine if the block is present in their caches. If a given processing unit has the block requested by the processing unit in its L1 cache, and the value in that block is modified, by the principle of inclusion, the L2 cache and any lower-level caches also have copies of the block (however, their copies are stale, since the copy in the processor's cache is modified). Therefore, when the lowest-level cache (e.g., L3) of the processing unit snoops the read operation, it will determine that the block requested is present and modified in a higher-level cache. When this occurs, the L3 cache places a message on the generalized interconnect informing the processing unit that it must "retry" its operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory or both, depending on the exact details of the implementation which are not specifically relevant to this invention. To retrieve the block from the higher-level caches, the L3 cache sends messages through the inter-cache connections to the higher-level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually retries the read request on the generalized interconnect. At this point, however, the modified value has been retrieved from the L1 cache of a processing unit and the read request from the initiating processor will be satisfied. The scenario just described is commonly referred to as a "snoop push." A read request is snooped on the generalized interconnect which causes the processing unit to "push" the block to the bottom of the hierarchy to satisfy the read request made by the initiating processing unit.

The key point to note is that when a processor wishes to read or write a block, it must communicate that desire with the other processing units in the system in order to maintain cache coherence. To achieve this, the cache-coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read, it receives a message indicating whether or not the read must be retired later. If the read operation is not retried, the message usually also includes information allowing the processing unit to determine if any other processing unit also has a still-active copy of the block (this is accomplished by having the other lowest-level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive." If a block is marked exclusive, it is permissible to allow the processing unit to later write the block without first communicating with other processing units in the system because no other processing unit has a copy of the block. Therefore, it is possible for a processor to read or write a location without first communicating this intention onto the interconnection, but only where the coherency protocol has insured that no other processor has an interest in the block.

The foregoing cache-coherency technique is implemented in a specific protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache. As seen in FIG. 2, if a sector is in any of the Modified, Shared or Invalid states, it can move between the states depending upon the particular bus transaction. While a sector in an Exclusive state can move to any other state, a sector can only become Exclusive if it is first Invalid.

A further improvement in accessing cache blocks can be achieved using the aforementioned cache-coherency protocol. This improvement, referred to as "intervention," allows a cache having control over a memory block to provide the data or instruction in that block directly to another cache requesting the value (for a read-type operation), in other words, bypassing the need to write the data or instruction to system memory and then have the requesting processor read it back again from memory. Intervention can only be performed by a cache having the value in a block whose state is Modified or Exclusive. In both of these states, there is only one cache block that has a valid copy of the value, so it is a simple matter to source the value over the bus 20 without the necessity of first writing it to system memory. The intervention procedure thus speeds up processing by avoiding the longer process of writing to and reading from system memory (which actually involves three bus operations and two memory operations). This procedure not only results in better latency, but also increased usable bus bandwidth.

Prior-art protocols do not provide for intervention when data or instructions are held in Shared states by two or more caches because, generally, it is difficult to determine which cache would source the value. Intervention with Shared cache states can be provided if a system collects all of the Shared responses and then picks (e.g., arbitrarily) which cache should source the value, but this approach is generally no faster than getting the value from memory, and so it provides little benefit. Also, since instructions which are prepared for execution (as opposed to data) are never written, only read, the state of any cache block containing only valid instructions is always Shared, and so instructions cannot be sourced by way of intervention. It would, therefore, be desirable to devise a method of maintaining cache coherency which allowed for efficient intervention of data or instructions with Shared states. It would be further advantageous if the method extended a processor's cache to more effectively allow the processor to use a cache associated with another processor in the multi-processor computer system.

SUMMARY OF THE INVENTION

It is therefore one object of the present invention to provide an improved method of maintaining cache coherency in a multi-processor computer system.

It is another object of the present invention to provide such a method that allows for improved intervention response.

It is yet another object of the present invention to provide such a method that additionally allows intervention when two or more caches hold the relevant instruction or data in a shared (i.e., valid) state.

The foregoing objects are achieved in a method of extending a cache of a requesting processing unit in a multi-processor computer system, generally comprising the steps of loading a value from a system memory device into at least one cache of an adjacent processing unit which is connected to the requesting processing unit by a system bus, providing an indication that at least one cache of an adjacent processing unit contains a copy of the value that was most recently accessed, issuing an inquiry onto the system bus from the requesting processing unit to read the value, and responding to the inquiry by sourcing the value from the cache of the adjacent processing unit. Each cache has at least one cache line with a block for storing the value, and the step of providing an indication indicates that a cache line having a block which contains the value is in a recently read state. Each cache has a first plurality of bits for storing the value and a second plurality of bits for storing a state value, and a state value is assigned to the second plurality of bits in the cache containing the copy of the value that was most recently accessed. Any caches containing a valid copy of the value, other than the cache which contains a copy of the value that was most recently accessed, are assigned a state indicating that they hold the valid copy in a shared state. After requesting the value, the cache of the requesting processing unit is provided with an indication that it is now the cache containing a copy of the value that was most recently accessed. This approach significantly improves the processing speed of the computer system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
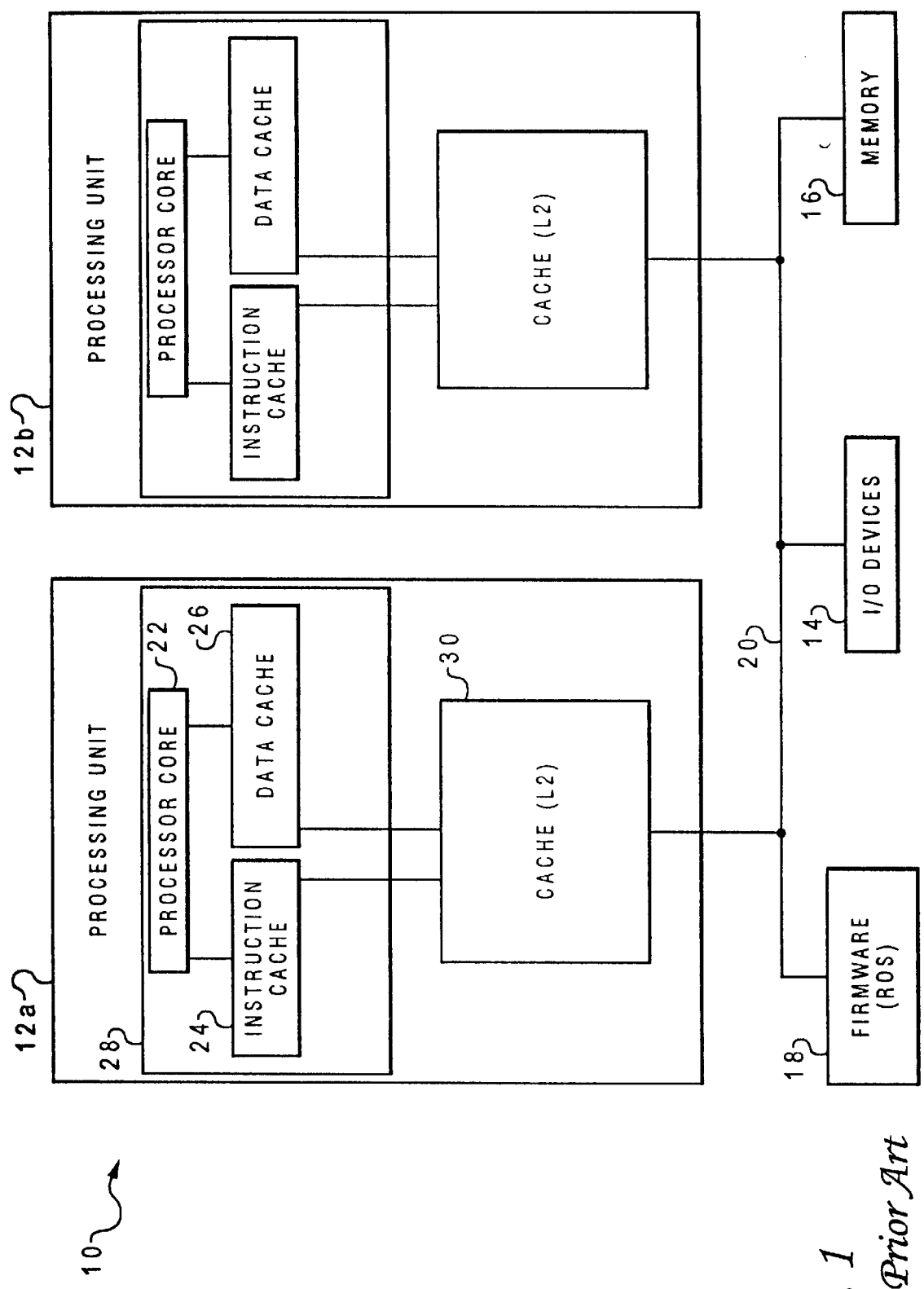
FIG. 1 is a block diagram of a prior-art multi-processor computer system.

The present invention is directed to a method of maintaining cache coherency in a multi-processor system, such as the system of FIG. 1, but the present invention could be applied to computer systems that are not necessarily conventional, i.e., they could include new hardware components not shown in FIG. 1, or have a novel interconnection architecture for existing components. Therefore, those skilled in the art will appreciate that the present invention is not limited to the generalized system shown in that figure.

Figure 3:
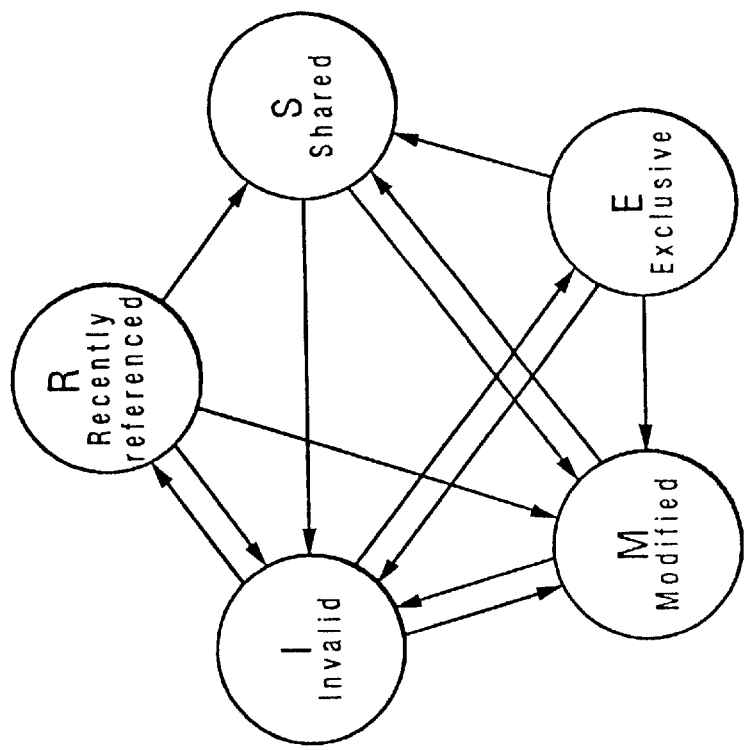
FIG. 3 is a state diagram depicting the cache-coherency protocol of the present invention.
Figure 2:
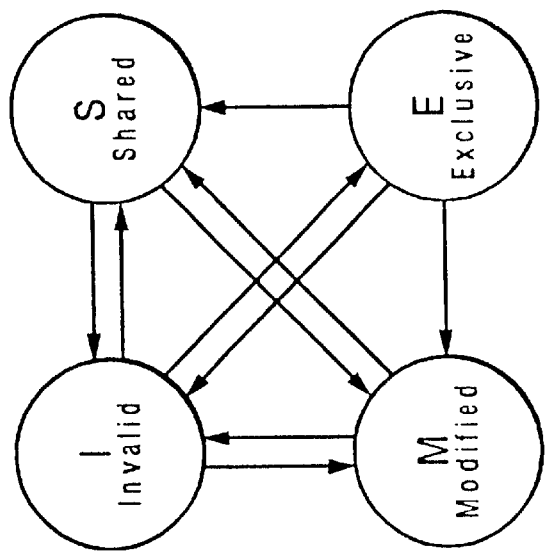
FIG. 2 is a state diagram depicting a prior-art cache-coherency protocol (MESI)

With reference now to FIG. 3, there is depicted a state diagram of one embodiment of the cache-coherency protocol of the present invention. This protocol is similar to the prior-art MESI protocol of FIG. 2, in that it includes the same four states (Modified, Exclusive, Shared and Invalid), but it also includes a new "R" state (Recent), for providing an indication of the most recently referenced block that would otherwise have a shared indication. In other words, when two or more caches hold valid copies of an instruction or data value, all of them will be in the Shared state except for the cache which most recently accessed the instruction or data value, and that cache will be in the Recent state. Since there are now five possible total states, each cache entry requires a three-bit field (instead of a two-bit field as in the prior art) to identify which state the entry possesses.

This new protocol is referred to herein as the "R-MESI" protocol. Under this protocol, a new coherency response is also provided, that of Shared-Intervention, as explained further below. As with the prior-art protocol, the four M-E-S-I states may change based on the initial state of the entry and the type of access sought by the requesting processor. The manner in which these four states change is generally identical to the prior-art MESI protocol, with the exceptions noted below.

Table 1 shows the master cache state transitions for read-type operations, where a "miss" occurs:

TABLE 1

| | Bus Operation | Master State | Coherency Response |
|---|---|---|---|
| 1 | Read | I → R | ShrI, Shr, or Mod |
| 2 | RWITM | I → E | ShrI, Shr, or Null |
| 3 | Read | I → E | Null |
| 4 | RWITM | I → M | Mod |

The Recent state is entered on a "Read miss" bus operation (the first row of Table 1) if the coherency response is Modified (Mod), Shared (Shr), or Shared-Intervention (ShrI); if the response is Modified on a "Read miss" operation, the modified cache will send the instruction or data to memory also, so it is no longer Modified. If there is no coherency response (Null) on a "Read miss" operation (the third row of Table 1), then the Exclusive state is entered as with the prior-art MESI protocol. On an "RWITM miss" operation (RWITM is an abbreviation for Read With Intent To Modify), the Exclusive state is entered if the coherency response is Null, Shr or ShrI (the second row of Table 1), and the Modified state is entered if the coherency response is Mod (the fourth row of Table 1). The RWITM cases apply only to data or instructions still being prepared for execution, since instructions once prepared for execution typically are not modified.

Table 2 shows an example of how the bus transactions influence the cache when acting as a snooper, for read-type operations (read hits):

TABLE 2

| | Bus Operation | Snooper State | Coherency Response |
|---|---|---|---|
| 1 | Read-Burst | R → S | ShrI |
| 2 | Read-Burst | E → S | ShrI |
| 3 | Read-Burst | M → S | Mod |
| 4 | RWITM | E or R → I | ShrI |
| 5 | RWITM | M → I | Mod |

For either an Exclusive or Recent beginning state (the first, second, and fourth rows of Table 2), the cache will transmit a Shared-Intervention coherency response, meaning that it will source its copy of the instruction or data via intervention directly to the requesting processor, without involvement from the system memory. Whenever an instruction is so sourced, the next state becomes Shared for a "Read hit" operation (the first and second rows of Table 2) or Invalid for an "RWITM hit" operation (the fourth row of Table 2). In those cases where the beginning state is Modified (the third and fifth rows of Table 2), which again do not apply in the case of instructions since program instructions are typically not modified, the coherency response will be Modified; intervention still occurs. If the bus operation was an "RWITM," the data is transferred from cache to cache, but if the bus operation was a read, the data is sent both to the cache and to memory.

By sourcing a most recently read value from a horizontally adjacent cache (i.e., a cache which is not part of the requesting processing unit but rather is part of an adjacent processing unit), a given processing unit effectively extends its cache to include any cache having a recently read copy of a data value or an instruction.

As noted above, for those states and operations not shown in Tables 1 and 2, transitions and coherency responses are performed in accordance with the prior-art MESI protocol with one qualification, namely, a cache entry can have an "R" state which is subjected to a write operation, and that entry will undergo a transition to a Modified state in a manner similar to that occurring when a Shared entry is subjected to a write operation. The following points might further be noted with respect to the R-MESI protocol: an entry can never go from Invalid to Shared (it would go to Recent instead); an entry can never go from Exclusive to Recent (it would go to Shared); an entry can never go from Recent to Exclusive (just as a Shared entry cannot go to Exclusive); and an entry can never go from Modified to Recent (it would go to Shared, while entry in the cache of the requesting processor would go to Recent).

With this new R-MESI protocol, the ownership of a block migrates to the last cache to read the instruction or data, which has the added benefit of staying most recently used and thereby lessening the chance of deallocation if a least recently used (LRU) cache replacement mechanism is employed. The "R" cache state can also be advantageously used for other applications, such as an intelligent input/output (I/O) controller interrupting the processor/cache which has most recently read a cached I/O status location, since this processor/cache would be most likely to have cached the I/O device driver code and, therefore, could execute the code faster than in another processor that needs to fetch the code into its cache.

By providing intervention for shared instructions and data (that is, instructions or data which are validly present in more than one cache) memory latency is significantly improved. In one evaluation of the R-MESI protocol, performance increased according to an industry standard benchmark from 5300 $TPM_c$ to 7500 $TPM_c$ (transactions per minute) when compared to the prior-art MESI protocol. Generally, the present invention frees up the memory controller, and demand on memory bandwidth is lessened. An additional benefit is that instructions can now be intervened since instructions can also be in a Recent state. The present invention has the practical effect of extending a processing unit's cache horizontally, i.e., giving the processor access to a cache it did not use as much before.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of extending a cache of a requesting processing unit in a multi-processor computer system, comprising the steps of:

loading a value from a system memory device into at least two caches of adjacent processing units which are connected to the requesting processing unit by a system bus;

providing an indication that at least one cache of an adjacent processing unit contains an unmodified, shared copy of the value that was most recently read;

issuing an inquiry onto the system bus from the requesting processing unit to read the value; and responding to the inquiry by sourcing the value from the cache of the adjacent processing unit containing the copy of the value that was most recently accessed.

2. The method of claim 1 wherein each cache has at least one cache line with a block for storing the value, and said step of providing an indication indicates that a cache line having a block which contains the value is in a recently read state.

3. The method of claim 2 further comprising the step of providing an additional indication that any cache containing a valid copy of the value, other than the cache which contains a copy of the value that was most recently read, holds the valid copy in a shared state.

4. The method of claim 1 wherein:

each cache has a first plurality of bits for storing the value and a second plurality of bits for storing a state value; and said step of providing an indication includes the step of assigning a state value to the second plurality of bits in the cache containing the copy of the value that was most recently read.

5. The method of claim 1 further comprising the step of providing an additional indication that any cache containing a valid copy of the value, other than the cache which contains a copy of the value that was most recently read, holds the valid copy in a shared state.

6. The method of claim 1 wherein said step of issuing an inquiry includes the step of transmitting to the system bus an address of the value corresponding to its location in the system memory device.

7. The method of claim 1 further comprising the step of changing the indication to indicate that the cache of the requesting processing unit is now the cache containing a copy of the value that was most recently read.

8. The method of claim 7 comprising the further step of providing an additional indication that the cache which previously contained a copy of the value that was most recently read now has a shared copy of the value.

9. A computer system comprising:
a system memory device;
a bus connected to said system memory device;
at least three processing units connected to said bus, each of said processing units having at least one cache for storing values from said system memory device; and
means for extending a cache of a requesting processing unit to allow a cache of an adjacent processing unit having an unmodified, shared copy of a value which is the same as a corresponding value in said system memory device to source the value to said cache of said requesting processing unit, said extending means further providing an indication of which cache of the adjacent processing unit contains a copy of the value that was most recently read.

10. The computer system of claim 9 wherein each said cache includes a cache entry having a first plurality of bits for storing the value and a second plurality of bits for identifying a state of an associated cache entry, said state providing an indication of which of said caches contains the most recently read copy of the value.

11. The computer system of claim 10 wherein said second plurality of bits, in addition to identifying a state of a given cache entry as being the most recently read copy of the value, is further adapted to identify the given cache entry as being in a state selected from the group consisting of a modified state, an exclusive state, a shared state, and an invalid state.

12. The computer system of claim 9 wherein said cache extending means includes means for changing any indication that a cache contains the most recently read copy of the value in response to an inquiry from said requesting processing unit indicating that said requesting processing unit desires to read the value.

13. The computer system of claim 9 wherein each said cache further has means for indicating, if it has a copy of the value that was not most recently read, that it has a shared copy of the value.

14. The computer system of claim 9 wherein said cache extending means for indicating that the cache of the requesting processing unit is now the cache containing a copy of the value that was most recently read.

15. A method of providing instructions to a processing unit in a multi-processor computer system, comprising the steps of:
loading an instruction into a plurality of caches, each cache associated with a respective one of a plurality of processing units of the computer system;
providing an indication of which of the caches contains a copy of the instruction that was most recently read in an unmodified form;
responding to an inquiry from a processing unit desiring to access the instruction by transmitting the indication; and
the processing unit, which has the cache containing a copy of the instruction that was most recently read, sourcing the instruction to the processing unit desiring to access the instruction.

16. The method of claim 15 wherein each said cache has at least one cache line with a block for storing the instruction, and said step of providing an indication indicates that a cache line having a block which contains the instruction is in a "recently read" state.

17. The method of claim 16 further comprising the step of providing an additional indication that any cache containing the instruction, other than the cache containing a copy of the instruction that was most recently read, has a shared copy of the instruction.

18. The method of claim 15 wherein:
each cache has a first plurality of bits for storing the instruction; and
said step of providing an indication includes the step of assigning a state value to a second plurality of bits in the cache containing the copy of the instruction that was most recently read.

19. The method of claim 15 further comprising the step of the processing unit which desires to access the instruction detecting transmission of the indication.

20. The method of claim 15 wherein:
the inquiry from the processing unit desiring to access the instruction indicates that said processing unit desires to read the instruction; and
further comprising the step of changing the indication to indicate that the cache of the processing unit desiring to access the instruction is now the cache containing a copy of the instruction that was most recently read.

21. The method of claim 20 comprising the further step of providing an additional indication that the cache which previously contained a copy of the instruction that was most recently read now has a shared copy of the instruction.

22. A computer system comprising:
a memory device;
a bus connected to said memory device;
a plurality of processing units connected to said bus, each processing unit having a cache for storing instructions from said memory device, and each cache further having means for indicating which of said caches contains the most recently read copy of an instruction in an unmodified form; and
means for sourcing the instruction from a cache containing the most recently read copy of the instruction to a cache of a processing unit desiring to read the instruction.

23. The computer system of claim 22 wherein each said cache includes a cache entry having a first plurality of bits for storing the instruction and a second plurality of bits for identifying a state of a given cache entry, said state providing said indication of which of said caches contains the most recently read copy of the instruction.

24. The computer system of claim 22 wherein each said cache further includes means for changing any indication that a cache contains the most recently read copy of the instruction in response to an inquiry from a processing unit desiring to read the instruction.

25. The computer system of claim 24 wherein each said cache further includes means for indicating that a processing unit which desires to read the instruction now has a cache containing a copy of the instruction that was most recently read.

26. The computer system of claim 22 wherein each said cache further has means for indicating, if it has a copy of the instruction that was not most recently read, that it has a shared copy of the instruction.

27. A method of providing data to a processing unit in a multi-processor computer system, comprising the steps of:

loading a data value into a plurality of caches, each cache associated with a respective one of a plurality of processing units of the computer system;

providing an indication of which of the caches contains a copy of the data value that was most recently read in an unmodified form;

responding to an inquiry from a processing unit desiring to access the data value by transmitting the indication; and the processing unit, which has the cache containing a copy of the data value that was most recently read, sourcing the data value to the processing unit desiring to access the data value.

28. The method of claim 27 wherein each said cache has at least one cache line with a block for storing the data value, and said step of providing an indication indicates that a cache line having a block which contains the data value is in a "recently read" state.

29. The method of claim 28 further comprising the step of providing an additional indication that any cache containing the data value, other than the cache containing a copy of the data value that was most recently read, has a shared copy of the data value.

30. The method of claim 27 wherein:

each cache has a first plurality of bits for storing the data value; and said step of providing an indication includes the step of assigning a state value to a second plurality of bits in the cache containing the copy of the data value that was most recently read.

31. The method of claim 27 further comprising the step of the processing unit which desires to access the data value detecting transmission of the indication.

32. The method of claim 27 wherein:

the inquiry from the processing unit desiring to access the data value indicates that said processing unit desires to read the data value; and further comprising the step of changing the indication to indicate that the cache of the processing unit desiring to access the data value is now the cache containing a copy of the data value that was most recently read.

33. The method of claim 32 comprising the further step of providing an additional indication that the cache which previously contained a copy of the data value that was most recently read now has a shared copy of the data value.

34. The method of claim 27 wherein:

the inquiry from the processing unit desiring to access the data value indicates that said processing unit desires to write the data value; and further comprising the step of changing the indication to indicate that the cache which contained a copy of the data value that was most recently read now has an invalid copy of the data value.

35. The method of claim 27 further comprising the steps of:

modifying the data value in the cache that contains a copy of the data value that was most recently read; and providing a new indication that the data value has been modified.

36. A computer system comprising:

a memory device;

a bus connected to said memory device;

a plurality of processing units connected to said bus, each processing unit having a cache for storing data values from said memory device, and each cache further having means for indicating which of said caches contains the most recently read copy of a data value in an unmodified form; and means for sourcing the data value from a cache containing the most recently read copy of the data value to a cache of a processing unit desiring to read the data value.

37. The computer system of claim 36 wherein each said cache includes a cache entry having a first plurality of bits for storing the data value and a second plurality of bits for identifying a state of a given cache entry, said state providing said indication of which of said caches contains the most recently read copy of the data value.

38. The computer system of claim 37 wherein said second plurality of bits, in addition to identifying a state of a given cache entry as being the most recently read copy of the data value, is further adapted to identify the given cache entry as being in a modified state, an exclusive state, a shared state, or an invalid state.

39. The computer system of claim 37 wherein each said cache further includes means for changing any indication that a cache contains the most recently read copy of the data value in response to an inquiry from a processing unit desiring to read the data value.

40. The computer system of claim 39 wherein each said cache further includes means for indicating that a processing unit which desires to read the data value now has a cache containing a copy of the data value that was most recently read.

41. The computer system of claim 36 wherein each said cache further includes means for indicating that a copy of the data value is invalid, in response to an inquiry from a processing unit desiring to modify the data value.

42. The computer system of claim 36 wherein each said cache further has means for indicating, if it has a copy of the data value that was not most recently read, that it has a shared copy of the data value.

* * * * *